United States Patent
Mao et al.

(10) Patent No.: US 8,350,165 B2
(45) Date of Patent: Jan. 8, 2013

(54) FLEXIBLE TABLET

(75) Inventors: Chung-Fu Mao, Hsin-Chu (TW); Chung-Wen Hsu, Kaohsiung (TW); Chien-Chia Lien, Hsin-Chu (TW); Kuang-Yao Hsieh, Hsin-Chu (TW)

(73) Assignee: Waltop International Corporation, Hsinchu (TW)

( * ) Notice: Subject to any disclaimer, the term of this patent is extended or adjusted under 35 U.S.C. 154(b) by 672 days.

(21) Appl. No.: 12/539,585

(22) Filed: Aug. 11, 2009

(65) Prior Publication Data
US 2011/0000720 A1 Jan. 6, 2011

(30) Foreign Application Priority Data
Jul. 1, 2009 (TW) .............................. 98211932 U

(51) Int. Cl.
*G06F 3/041* (2006.01)
(52) U.S. Cl. .................................................. 178/18.03
(58) Field of Classification Search ........................ None
See application file for complete search history.

(56) References Cited

U.S. PATENT DOCUMENTS

| 5,726,668 A * | 3/1998 | Clement ...................... 715/723 |
| 2009/0256817 A1* | 10/2009 | Perlin et al. .................. 345/174 |
| 2011/0043479 A1* | 2/2011 | van Aerle et al. ............. 345/174 |

FOREIGN PATENT DOCUMENTS
WO WO 2009075577 A1 * 6/2009

* cited by examiner

*Primary Examiner* — Hoa T Nguyen
*Assistant Examiner* — Mark Fischer
(74) *Attorney, Agent, or Firm* — Huffman Law Group, P.C.

(57) ABSTRACT

A flexible tablet is disclosed, and particular disclosed a flexible tablet having both of a hard housing structure and a soft housing structure. The flexible tablet fix a control board in the hard housing structure for preventing the control board form bending and break resulting from external force. In the flexible tablet, the soft housing structure is applied instead of the hard housing of a conventional tablet to fix a sensing board therein. Therefore, the soft housing structure and the sensing board are integrated to form a flexible writing member of the flexible tablet. As a consequence of foregoing structure, the tablet is flexible and convenient to be stored and carried, and the cost of the tablet is reduced.

12 Claims, 4 Drawing Sheets

FLEXIBLE TABLET

FIELD OF THE INVENTION

The present invention relates to a flexible tablet, and particularly relates to a flexible tablet having both of a hard housing structure and a soft housing structure.

BACKGROUND OF THE INVENTION

In recent years, the tablet is applied to be the input devices of many electrical devices, such as the input device of computers, and thereby people can write and draw on the electrical devices by handwriting input. Referring to FIGS. 1A and 1B, they are respectively a stereoscopic form diagram illustrating the appearance of the conventional tablet 100 and an exploded view diagram illustrating the structure of the conventional tablet 100. The tablet 100 comprises a control board 102, a sensing board 104, a connecting bus 106, an upper cover 108 and a lower cover 110. The connecting bus 106 connects the control board 102 and the sensing board 104, and the upper cover 108 and the lower cover 110 constitute the whole housing of the tablet 100 for containing and holding the control board 102, the sensing board 104 and the connecting bus 106 therein. The upper cover 108 has a writing area 108a corresponded to the inductive loop area 104a in the sensing board 104. Both of the upper cover 108 and the lower cover 110 are made of a hard material, for example a plastic fabricated by plastic injection or a metal, and both of the upper cover 108 and the lower cover 110 cover all of the control board 102, the sensing board 104 and the connecting bus 106.

Generally, both of the upper cover 108 and the lower cover 110 are the hard plastic housings fabricated by plastic injection and they constitute the whole housing of the tablet 100 for containing and protecting the control board 102, the sensing board 104 and the connecting bus 106 therein. It has a need of a mold with large size for plastic injection because the area covered by the upper cover 108 and the lower cover 110 includes whole area of tablet 100. However, the larger size of the mold means that the cost of the mold is high. Therefore, the cost for fabricating the tablet 100 or the price of the tablet 100 is expensive and can not be reduced efficiently. Besides, it has a need to develop and fabricate different molds of plastic injection for the tablet with different size or for different appearance. However, the shape or appearance of the housing of the tablet can not be changed easily for customization because the cost for fabricating the mold is expensive and the process for fabricating the mold is complicated. Therefore, the appearance of the conventional tablet, such as the tablet 100, can not be diversified and flexible. Furthermore, the housing constituted by the upper cover 108 and the lower cover 110 is made of a plastic fabricated by plastic injection and is hard, thick and heavy. Accordingly, the housing of the tablet 100 is cumbersome and is easy to be broken by impacting or throwing down. The conventional tablet 100 is not only inconvenient to be stored and carried but also the conventional tablet 100 is easy to be bended and broken by external force because the housing of the tablet 100 is made of a hard material and it is inflexible.

Therefore, in view of foregoing drawbacks of conventional tablet, there is a need to provide a tablet with the characteristics of low fabricating cost, diversified appearance, low weight, being not easy to be broken by bending and being convenient to be stored and carried.

SUMMARY OF THE INVENTION

An objective of this invention is to provide a tablet with the characteristics of low fabricating cost, diversified appearance, low weight, being not easy to be broken by bending and being convenient to be stored and carried.

In one embodiment of the present invention, a flexible tablet having both of a hard housing structure and a soft housing structure is disclosed. The disclosed flexible tablet comprises a control board for controlling the flexible tablet, a sensing board for sensing a pointing device, a connecting member for electrically connecting the control board with the sensing board, a control board housing for containing and protecting the control board and part of the connecting member, and a sensing board housing for covering and protecting the sensing board and part of the connecting member. In this flexible tablet, the control board housing is a hard and inflexible housing made of a hard material, such as a plastic fabricated by plastic injection or a metal. The control board housing is a hard housing structure constituted by a hard top housing and a hard bottom housing so it can provide a firm protection to the control board. The sensing board housing is a soft and flexible housing made of a soft material and the sensing board housing is a soft housing structure constituted by a soft top cover and a soft bottom cover. Therefore, the writing member (or writing area) in the flexible tablet is flexible and convenient to be stored and carried, and the writing member (or writing area) in the flexible tablet is not easy to be broken by external force.

Therefore, the effect achieved with the present invention is to provide a flexible tablet having both of a hard housing structure and a soft housing structure. As a consequence of this structure, this structure not only provides a protection to the tablet but also the tablet has a diversified appearance and is flexible. Thereby, the tablet of this invention is convenient to be stored and carried, and the cost and the weight of the tablet can be reduced. Furthermore, the flexible tablet can be a mouse pad because the flexible tablet has a flat soft housing structure.

DESCRIPTION OF THE EXEMPLARY EMBODIMENTS

Figure 2A:
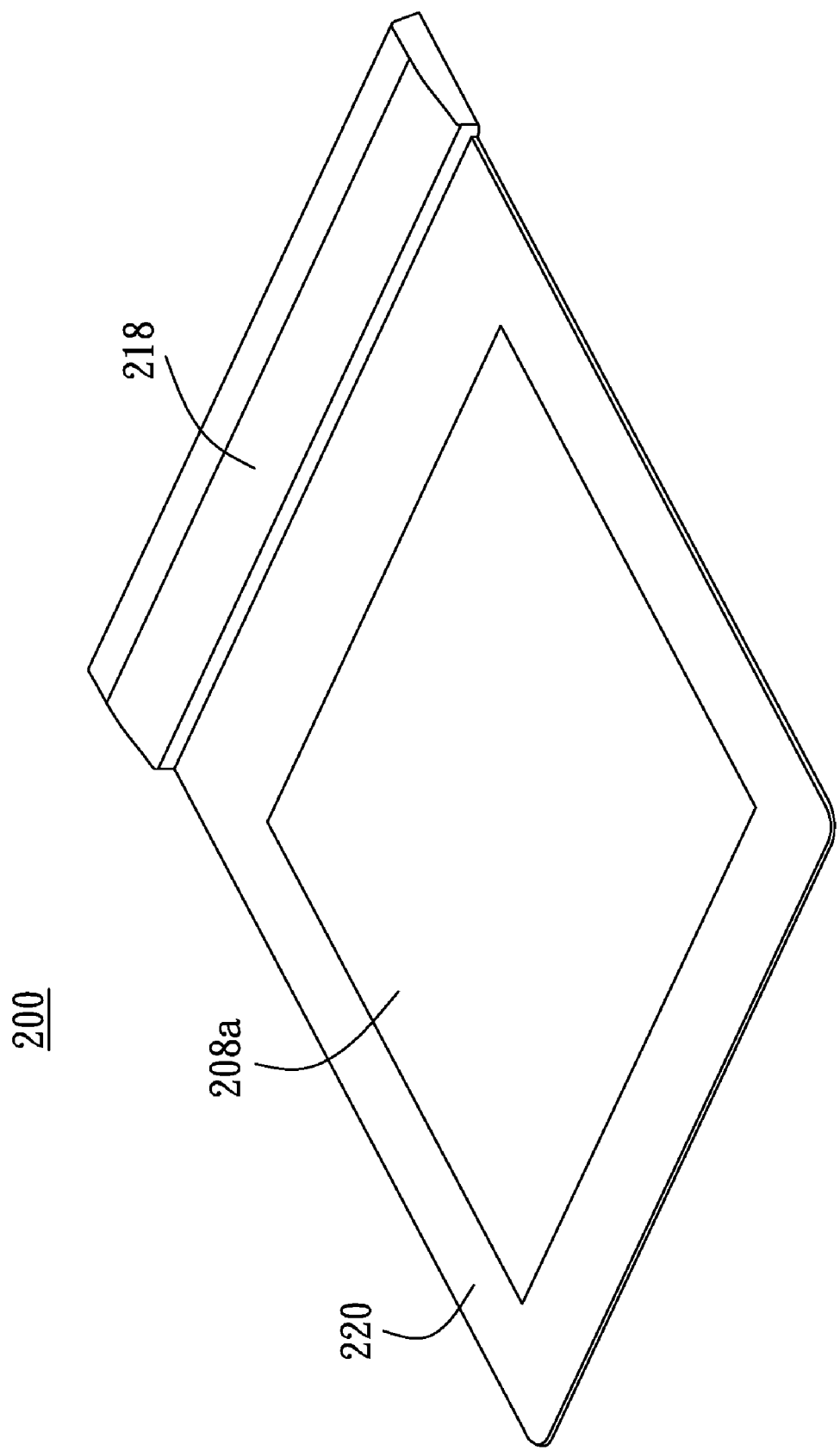
FIG. 2A is a stereoscopic form diagram illustrating the appearance of a flexible tablet in accordance with one embodiment of the present invention.
Figure 2B:
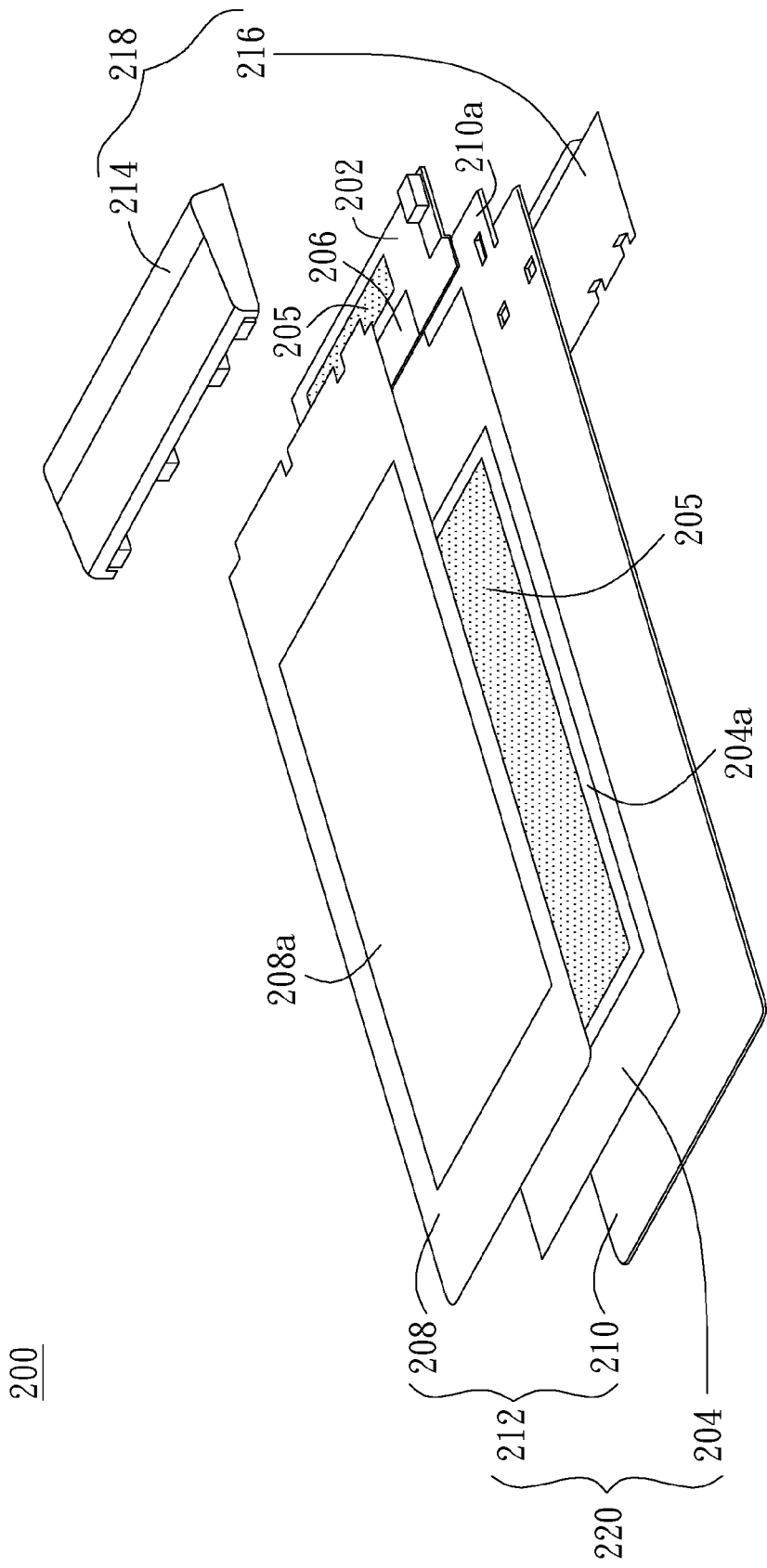
FIG. 2B is an exploded view diagram illustrating the structure of a flexible tablet in accordance with one embodiment of the present invention.

Referring to FIGS. 2A and 2B, they are respectively a stereoscopic form diagram illustrating the appearance of the flexible tablet 200 and an exploded view diagram illustrating the structure of the flexible tablet 200 in accordance with one embodiment of the present invention. The flexible tablet 200 comprise a control board 202 for controlling the flexible tablet 200, a sensing board 204 for sensing a pointing device, a connecting member 206 for electrically connecting the control board 202 with the sensing board 204, a control board housing 218 for containing and protecting the control board 202 and part of the connecting member 206, and a sensing board housing 212 for covering and protecting the sensing board 204 and part of the connecting member 206.

In the flexible tablet 200, the sensing board 204 is a soft and flexible board having an inductive area 204a, and the inductive area 204a has at least an inductive loop disposed therein for sensing a pointing device, such as an electromagnetic pen. The connecting member 206 is a connecting bus. The connecting member 206 is not only used as the electrical connection between the control board 202 and the sensing board 204 but also it is used as a tangible connection between the control board 202 and the sensing board 204.

The control board housing 218 is a hard and inflexible housing made of a hard material and the control board housing 218 comprises a hard top housing 214 and a hard bottom housing 216. The control board housing 218 is constituted by the hard top housing 214 and the hard bottom housing 216. Both of the hard top housing 214 and the hard bottom housing 216 are made of a hard material, for example a plastic fabricated by plastic injection (a plastic housing fabricated by plastic injection), a metal or other hard and inflexible material. The hard material is a rigid and inflexible material and the control board 202 is hard and inflexible board. Therefore, the control board housing 218 provide a firm protection to the control board 202 against bending and break resulting from impacting, throwing down, or external force. The hard top housing 214 and the hard bottom housing 216 are connected with each other to constitute the control board housing 218 by tenon, screws, rivets, or ultrasonic wave. Therefore, the control board 202 is fixed and held between the hard top housing 214 and the hard bottom housing 216. Furthermore, the hard bottom housing 216 is smaller than the bottom of the hard top housing 214 and so the hard bottom housing 216 is embedding in the bottom of the hard top housing 214 when the hard top housing 214 is attached to the hard bottom housing 216. Therefore, both the bottoms of the hard top housing 214 and the hard bottom housing 216 are positioned in the same plane without any part protruding from the bottom of the hard top housing 214, and both the bottoms of the control board housing 218 and the sensing board housing 212 are positioned in the same plane for putting the flexible tablet 200 on a table without any bending.

The sensing board housing 212 is a soft and flexible housing made of a soft material and the sensing board housing 212 comprises a soft top cover 208 and a soft bottom cover 210. The sensing board housing 212 is constituted by the soft top cover 208 and the soft bottom cover 210. Both of the soft top cover 208 and the soft bottom cover 210 are made of a soft material, for example a soft plastic, a silica gel, a rubber or other soft and flexible material. The soft plastic is a flexible plastic with low hardness, for example Polyvinylchloride (PVC), Polyethylene terephthalate (PET), Polycarbonate (PC), Polyurethane (PU) and etc. The soft top cover 208 has a writing area 208a corresponded to the inductive loop area 204a in the sensing board 204 for a pointing device (such as an electromagnetic pen) writing thereon.

An adhesive material is spread or adhered on the inner sides of the soft top cover 208 and the soft bottom cover 210 for adhering the soft top cover 208 and the soft bottom cover 210 to the upper surface and the lower surface of the inductive board 204 respectively. Therefore, the sensing board 204 is fixed and held in the sensing board housing 212 for constituting a writing member 220. The writing member 220 constituted by the sensing board 204, the soft top cover 208 and the soft bottom cover 210 is a flexible structure with low hardness because the sensing board 204 is a flexible board and both of the soft top cover 208 and the soft bottom cover 210 are flexible covers with low hardness. The writing member 220 is provided for sensing the action of a pointing device (such as an electromagnetic pen) to write and draw thereon.

Furthermore, the soft bottom cover 210 has an extended member 210a, which extends into the control board housing 218 and extends to the bottom of the control board 202 for being connected with the control board 202. The connection between the control board 202 and the sensing board 204 is enhanced because the control board 202 is connected with the sensing board 204 not only by the connecting member 206 but also by the extended member 210a. Inside the flexible tablet 200, the control board housing 218 is connected with the sensing board housing 212 by the extended member 210a inside the flexible tablet 200, and outside the flexible tablet 200, the control board housing 218 and the sensing board housing 212 are occluded with each other for connecting the control board housing 218 and the sensing board housing 212. By this way, a firm connection is formed between the control board housing 218 and the sensing board housing 212 by both of adhering to each inside them and occluding with each other outside them for forming whole housing of the flexible table 200. Therefore, the control board housing 218 and the sensing board housing 212 can be connected with each other efficiently for prevent any part of them from loosing or coming off.

Besides, a protective film (such as a waterproof film) or a molding compound 205 is provided in this invention for the purpose of enhancing the waterproof protection of the flexible tablet 200, preventing the flexible tablet 200 from contacting with water and mist, and preventing the flexible tablet 200 from damage resulting from water and mist (such as FIG. 2B showing). The protective film or a molding compound 205 can be applied to where need to be waterproof in the tablet 200, for example the circuits of the control board 202, the inductive loops of the sensing board 204, the flat lines of the connecting member 206, or even the whole control board 202, the whole sensing board 204 or the whole connecting member 206 can be sealed up with the protective film (such as a waterproof film) for preventing the flexible tablet 200 from contacting with water and mist.

Figure 1A:
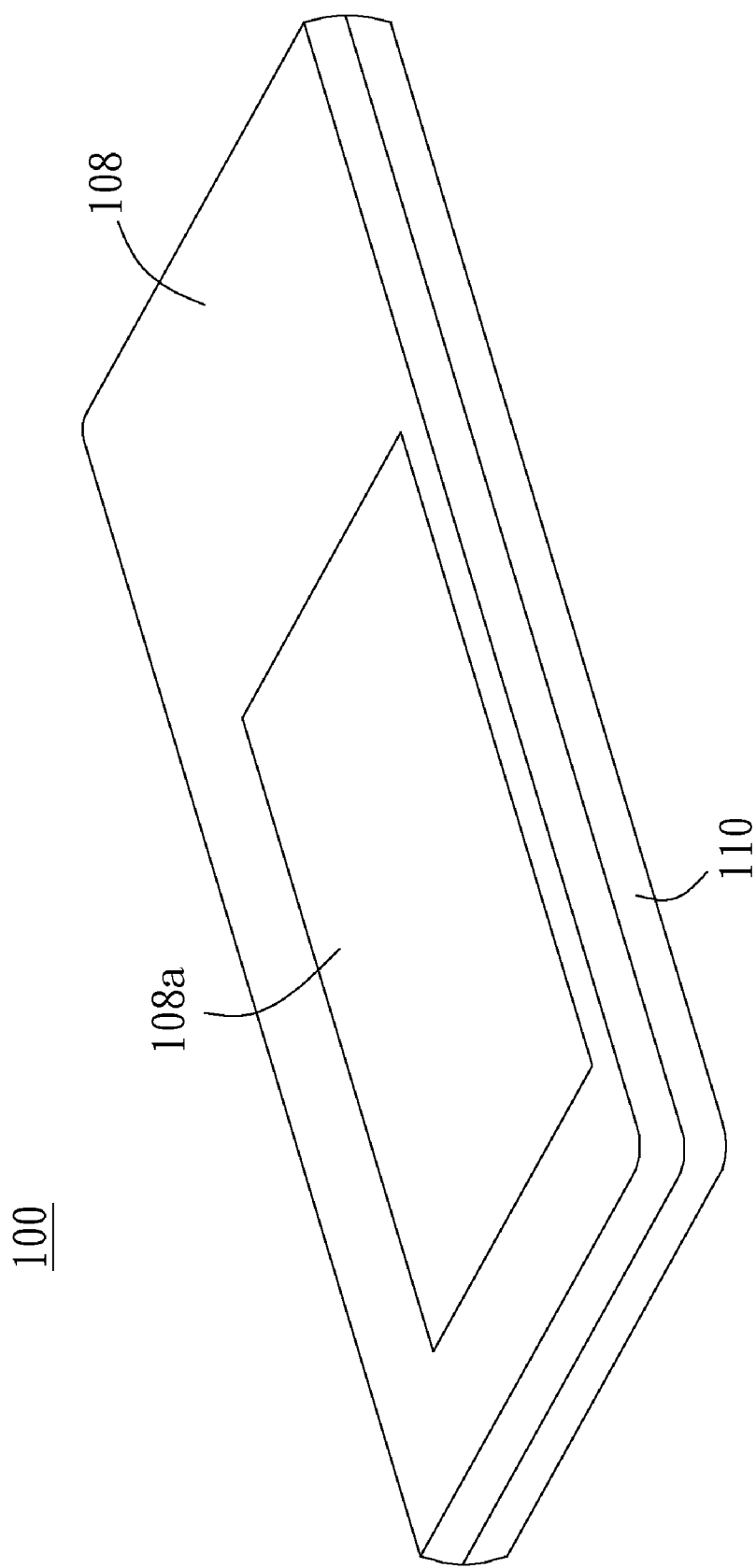
FIG. 1A is a stereoscopic form diagram illustrating the appearance of a conventional tablet.
Figure 1B:
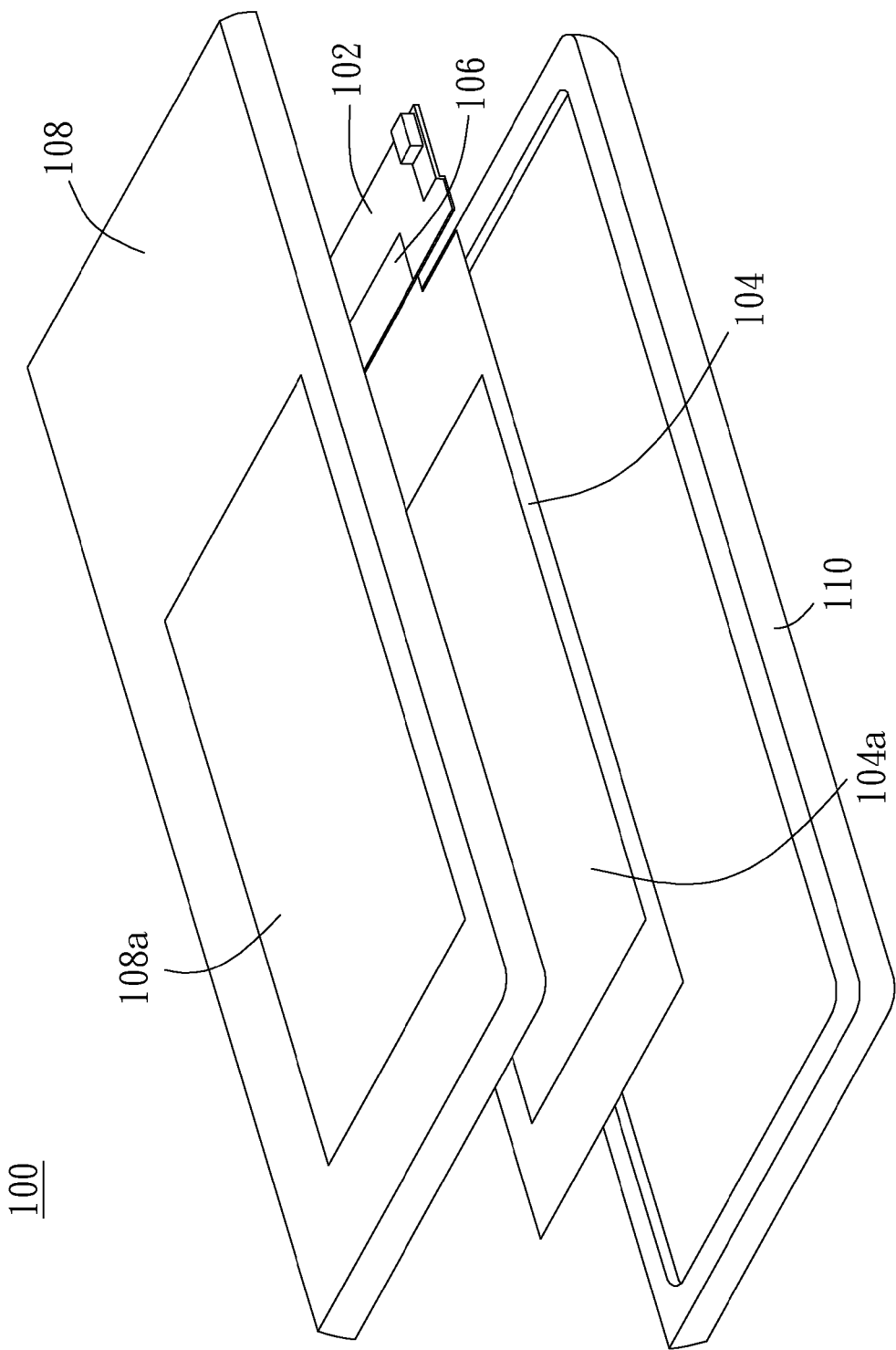
FIG. 1B is an exploded view diagram illustrating the structure of a conventional tablet.

In the flexible tablet 200, only the control board housing 218 has a need that a mold is fabricated and provides to form the control board housing 218 (including the hard top housing 214 and the hard bottom housing 216) made of the material of plastic injection, a metal, or other hard material because only the control board housing 218 is a hard housing structure. Therefore, comparing with the conventional tablet 100 (illustrating in FIGS. 1A and 1B), the mold which the flexible tablet 200 of the present invention needs is significantly smaller than the mold which the conventional tablet 100 needs. It results in that the cost of the flexible tablet 200 is lower than the cost of the conventional tablet 100 and the price of the flexible tablet 200 and the cost for fabricated the flexible tablet 200 are significantly reduced.

In the present invention, the flexible tablet 200 is flexible and convenient to be stored and carried because the sensing board housing 212 is made of a flexible and soft material with a lower hardness. The flexible and soft material is a soft plastic, a silica gel, a rubber or other soft and flexible material. Therefore, the sensing board housing 212 has no need to be fabricated by any mold, and it can be cut for having any different shapes easily, such as a circular shape, a trapezoid shape, a star shape, or any desired shape and thereby the shape of the flexible tablet 200 becomes more flexible and diversified. Secondly, it is easy to color above-mentioned soft materials by printing so their colors are changed easily. Therefore, comparing with the conventional tablet, the color of the flexible tablet 200 becomes more flexible and diversified. Furthermore, above-mentioned soft materials have the characteristics of low weight, shock resistance and impact resistance, and they are the material commonly used to make a mouse pad. Therefore, the flexible tablet 200 made of above-mentioned soft materials, especially the sensing board housing 212, has the characteristics of low weight, shock resistance and impact resistance. Both of the writing member 220 and the mouse pad are soft, flexible and flat boards because both of them are made of the same material. Therefore, the flexible tablet 200 can be used as a mouse pad.

In the flexible tablet of the present invention, a hard housing structure and a soft housing structure are collocated and connected with each other so the flexible tablet has the characteristics of low fabricating cost, low price, diversified appearance and color, flexibility, being not easy to be broken by bending and being convenient to be stored and carried, low weight, shock-resistance and impact-resistance and water-resistance.

Although the present invention will be described in accordance with the embodiments shown above, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A flexible tablet, comprising:
   a control board for controlling said flexible tablet;
   a sensing board for sensing a pointing device;
   a connecting member for electrically connecting said control board with said sensing board;
   a control board housing for containing and protecting said control board and part of said connecting member wherein said control board housing is a hard and inflexible housing and said control board housing comprises a hard top housing and a hard bottom housing; and
   a sensing board housing for covering and protecting said sensing board and part of said connecting member wherein said hard bottom housing is smaller than the bottom of said hard top housing for embedding said hard bottom housing in the bottom of said hard top housing and holding both the bottoms of said control board housing and said sensing board housing in the same plane.

2. The flexible tablet of claim 1, wherein said sensing board is a soft board having an inductive area, wherein said inductive area has at least an inductive loop disposed therein.

3. The flexible tablet of claim 1, wherein said connecting member is a connecting bus.

4. The flexible tablet of claim 1, wherein the material making up said hard top housing is a plastic fabricated by plastic injection or a metal, and the material making up said hard bottom housing is a plastic fabricated by plastic injection or a metal.

5. The flexible tablet of claim 1, wherein said sensing board housing is a soft and flexible housing.

6. The flexible tablet of claim 5, wherein said sensing board housing comprises a soft top cover and a soft bottom cover.

7. The flexible tablet of claim 6, wherein the material making up said soft top cover is a soft plastic, a silica gel or a rubber, and the material making up said soft bottom cover is a soft plastic, a silica gel or a rubber.

8. The flexible tablet of claim 7, wherein said soft plastic is Polyvinylchloride (PVC), Polyethylene terephthalate (PET), Polycarbonate (PC), or Polyurethane (PU).

9. The flexible tablet of claim 6, wherein said soft bottom cover has an extended member extending to said control board, wherein said extended member is connected with said control board for enhancing the connection between said control board and said sensing board.

10. The flexible tablet of claim 6, further comprising an adhesive material spread or adhered on the inner sides of said soft top cover and said soft bottom cover for adhering said soft top cover and said soft bottom cover to said sensing board in order to form said sensing board housing.

11. The flexible tablet of claim 1, further comprising a protective film or a molding compound for covering or sealing up an area on said control board, said sensing board and said connecting member.

12. The flexible tablet of claim 1, wherein said control board housing and said sensing board housing are occluded with each other for connecting said control board housing and said sensing board housing to form a whole housing of said flexible tablet.

* * * * *